United States Patent [19]

Pillette

[11] 4,232,736

[45] Nov. 11, 1980

[54] LEAK DETECTION SYSTEM AND CONTROL USING NON-RIGID BLADDER

[76] Inventor: Kibbie P. Pillette, Abbeville, La.

[21] Appl. No.: 954,578

[22] Filed: Oct. 23, 1978

Related U.S. Application Data

[63] Continuation-in-part of Ser. No. 786,576, Apr. 11, 1977, abandoned.

[51] Int. Cl.² ............................................. E21B 43/12
[52] U.S. Cl. .................................... 166/53; 137/312; 166/75 R; 285/93
[58] Field of Search .............. 166/53, 75 R; 137/312; 285/13, 15, 93, 156, 226; 73/40.5 R, 40.5 A, 46, 49.1, 49.5; 138/99; 116/264, 266

[56] References Cited

U.S. PATENT DOCUMENTS

| | | | |
|---|---|---|---|
| 425,369 | 4/1890 | Cowell | 285/13 |
| 2,766,614 | 10/1956 | Cook | 285/13 X |
| 2,817,230 | 12/1957 | McCully | 73/46 |
| 3,299,417 | 1/1967 | Sibthorpe | 285/93 |
| 3,310,322 | 3/1967 | Carroll | 137/312 X |
| 3,874,708 | 4/1975 | Gresens | 285/93 |
| 3,921,437 | 11/1975 | Hauk | 73/40.5 R |
| 3,975,945 | 8/1976 | Hauk et al. | 73/46 |
| 3,996,789 | 12/1976 | Wilson | 285/93 |
| 4,043,355 | 8/1977 | Cerruti et al. | 137/312 |
| 4,106,428 | 8/1978 | Matthiessen | 285/13 X |

FOREIGN PATENT DOCUMENTS 886674 1/1962 United Kingdom ............ 137/458

Primary Examiner—Ernest R. Purser
Attorney, Agent, or Firm—Keaty and Garvey

[57] ABSTRACT

A portable system for early detection of leaks from suspect piping fittings, for example, as used on the "Christmas tree" portion of a gas well provides an encapsulating bladder which sealably encapsulates the suspect fitting and collects leaks from the fitting. The apparatus provides, in the preferred embodiment, a bladder which can encase any suspect portion of the Christmas tree (or like piping system), such as for example, the choke jacket or other like fittings where maximum turbulence occurs as when gas or oil mixed with sand flows through the fitting. In the preferred embodiment, the collection of a leak within the bladder causes a regulator to operate a control valve and halt the flow of gas, oil, or like flowing material through the piping system of which the suspect fitting is a part. The system can be applied to any other similar existing and operating piping arrangement where the detection of leaks from suspect fittings is desirable. The portable bladder and shut off arrangement of the present invention has particular application in the offshore oil and gas industry, where it can perform a safety function on unmanned gas/oil well platforms.

16 Claims, 6 Drawing Figures

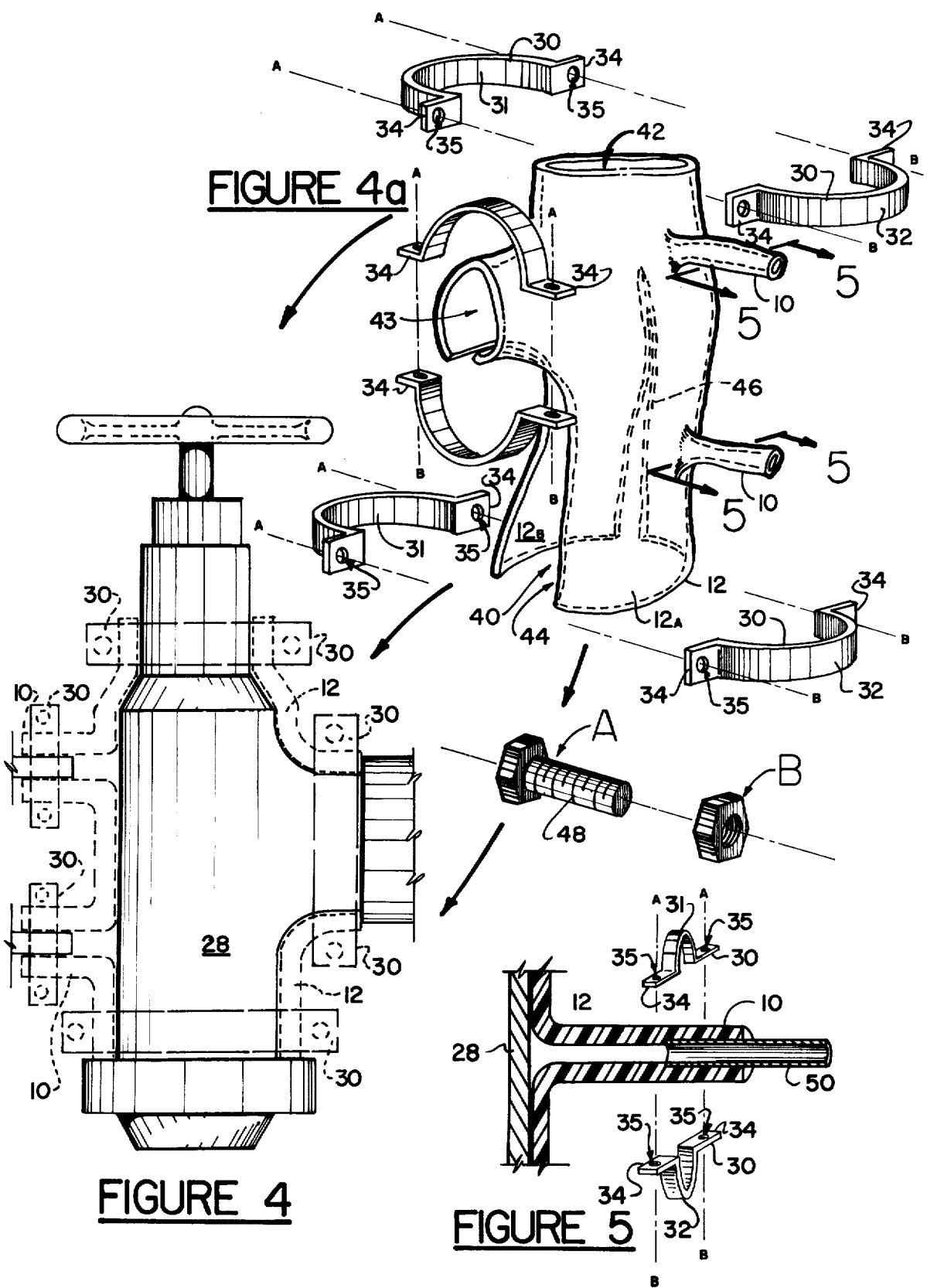

LEAK DETECTION SYSTEM AND CONTROL USING NON-RIGID BLADDER

REFERENCE TO RELATED APPLICATION

This is a continuation-in-part of U.S. Ser. No. 786,576 filed Apr. 11, 1977 and entitled "Pressure Safety Arrangement" now abandoned.

BACKGROUND OF THE INVENTION

1. Field of the Invention

The present invention relates to piping and piping systems, but more particularly the present invention relates to the detection of leaks in especially remote piping systems, with the indication of a leak being manifested by the closure of valves or like controller Even more particularly, the present invention relates to an apparatus for detecting leaks in suspect piping fittings as are a part of the "Christmas tree" portion of a natural gas well, and the closure of well control valves coincident with the occurence of such a leak from the suspect fitting.

2. General Background and Prior Art

In the production of natural gas, as well is normally drilled with a length of pipe known as a "drill string". The drill pipe is individually made up of sections which can be, for example, thirty (30') feet. The drill pipe is enclosed normally in a casing which is also welded or jointed. Casing is then cemented into place from the bottom up. At the head of the casing, the crew installs a master valve that may be closed quickly and surely to shut off the flow of gas. Above this valve is placed a "Christmas tree". A Christmas tree is merely an assembly of pipes and valves that allows the gas to flow into gathering lines. These gather the output of several wells and carry the fuel to the crosscounty pipelines for remote transmission of the gas. (See FIG. 1 of the specifications.) Many of the oil wells and gas wells presently in use are in remote areas, such as many miles offshore, in marshy areas, or in areas which are generally uninhabitable. A great problem arises when these remote or "robot" oil and gas rigs develop minute leaks which are not indicated and are not detected until a human inspection or until a disaster or accident occurs.

In offshore oil or gas wells, frequently the oil and/or gas partially consists of sand or other abrasive mineral which can eat away and mechanically erode the inner portions of a pipe or piping system. The problem is accentuated at fittings where the fluid stream must turn or otherwise be redirected, producing turbulence. The oil or gas stream containing sand, thus, can easily eat away and produce eventual cracks or leaks within fittings, such as, the choke jacket of the "Christmas tree" portion of a typical oil and gas well.

Engineers can generally determine what parts of the Christmas tree, or piping system are most turbulent and thus, where mechanical erosion will most probably occur. These "suspect" fittings once identified, need to be either regularly inspected, or replaced on a regular basis.

This is both time consuming and expensive, and additionally, it is impossible because of the economic considerations. For example, oil and gas wells which are many miles offshore may only be reached by boat or helicopter, and the cost of inspecting them on a daily basis can be prohibitive.

Thus, there is a need for a simple and inexpensive device which is easy to install on existing piping systems such as, the "Christmas tree" portion of an oil and gas well which system can readily determine the presence of even the most minute leak, and indicates the presence of such a leak by, for example, closing a gate valve or like control valve, halting the flow of fluids through the piping system for a leak allows precious minerals to escape, or causes an environmental disaster, or causes a disaster which can jeopardize human lives and property.

It is to this general field that the present invention is directed.

General Discussion of the Present Invention

The present invention provides a simple, economical, and portable system for the detection of minute leaks in existing flow lines, and a system for indication of a leak by, for example, the shut off of flow within the line before catastrophic failure of the line occurs. Such a device is especially important in the oil and gas industry, and in the transmission of natural gas where pressures developed within the flow lines can be quite high, and many wells are unmanned in remote areas where regular inspection is costly, inconvenient, difficult or impossible.

The present invention provided a portable bladder which can be sealably jacketed into position around a particular suspect fitting in any piping system which fitting may be suspect or subject to turbulence and damage. The bladder could be placed around existing fittings which would experience a maximum amount of turbulence or corrosion. It should be understood that the terms "fitting", or "suspect fitting" as used herein refers to any number of piping fittings such as elbows, tees, unions, choke jackets, valves, crosses and the like where turbulent flow can occur, thus making the fitting most suspect of failure, and a place where leaks would most likely occur in a piping system.

The present invention provdies a bladder for sealably encapsulating a suspect fitting portion of a piping system where leaks might occur. The bladder is preferably pliable being easily fittable in an encapsulating manner about a suspect fitting. The bladder can be sealably attached to the suspect fitting by a plurality of pipe clamps which would hold the bladder in a sealable fashion about the suspect fitting. At least one conduit attached to the bladder would transmit any leak collected by the bladder from the suspect fitting to a regulator. The pnuematic regulator would, responsive to the accumulation of a leak within the bladder, operate a control valve from a first "open flow position to a second closed flow position".

The present invention thus provides a remote leak detection and shut off apparatus for oil and gas wells, as well as, for related piping systems where it is desirable to indicate the presence of a leak from a suspect fitting and shut off the flow of fluid through the piping system coincident with the occurence of a leak therefrom.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein:

FIG. 4 is a sectional view of a typical choke jacket with the preferred embodiment of the apparatus of the present invention attached thereto in a sealable fashion;

FIG. 4-A is a prospective exploded view of the bladder portion of the preferred embodiment of the apparatus of the present invention illustrating the pipe clamps for holding the bladder to the suspect fitting in a sealable fashion;

FIG. 5 is a sectional view taken along lines 5.5 of FIG. 4-A.

DETAILED DESCRIPTION OF THE PREFERRED EMBODIMENT

Figure 1:
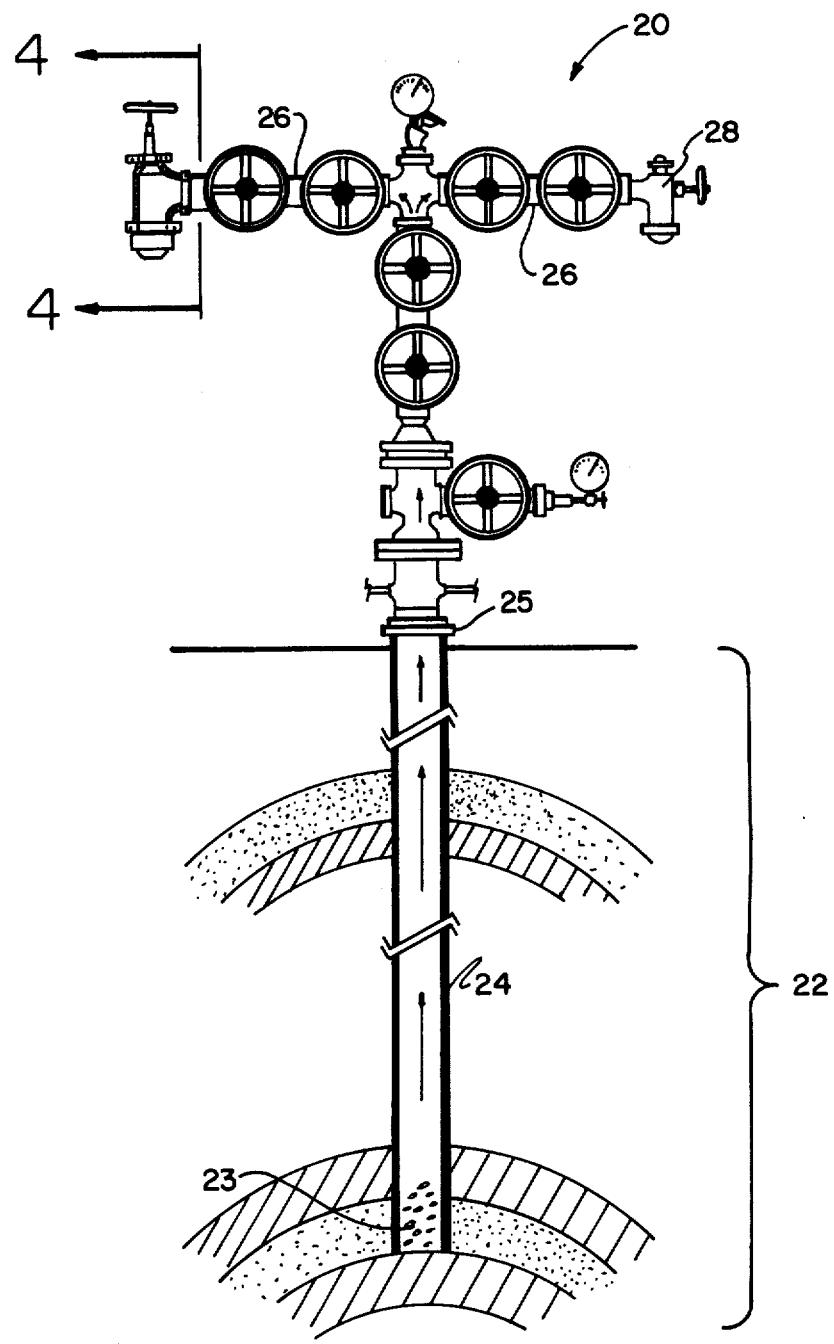
FIG. 1 is a schematic view of a typical oil and gas well illustrating the master valve and pipe assembly at the top portion of the well.

FIG. 1 illustrates a typical piping system with which the present invention has application, the system being a conventional oil and gas well showing a Christmas tree 20 mounted on the oil and gas well 22 itself. As can best be seen from FIG. 1, oil and gas enters the bottom portion of the well through screen pipe 23 and moves upwardly through tubing 24 to Christmas tree 20. Christmas tree 20 is attached at casing assembly 25 with for example, a flanged connection. As can best be seen from FIG. 1, the gas flows upwardly (see arrows) through Christmas tree 20 and passes laterally through manumatic valves 26 and then through choke jackets 28. Ofter a certain amount of sand or like abrasive material is combined with the oil and gas, creating a mchanically erosive effect akin to sandblasting on the inside of Christmas tree 20 and more particularly within the fittings, such as choke jacket 28. Choke jacket 28 is thus "suspect" in that the mechanically erosive effect of flow can eventually cause minute leaks which continuously grow until failure of the fitting or choke jacket occurs with the escape of volatile and polluting oil/gas presenting a hazard to property, lives and the environment.

FIG. 1 illustrates the portion of the oil and gas well to which the present invention could be directed in an exemplary installation, (i.e., the Christmas tree). It should be understood that the present invention could be applied to any piping situation where a particular fitting or section of pipe is subject to corrosion or failure and subsequent leaks. Thus, the present invention would be particularly useful in hazardous industries where even minute leaks would be either harmful, wasteful or even disastrous to property, lives, and the environment.

The Christmas tree 20 shown in FIG. 1 is provided with manumatic valves 26 which control the flow of natural gas from the well 22 to transmission pipelines. As can be seen by the arrows in FIGS. 1, 2 and 3, the gas flows upwardly and then laterally through valves 26 to choke jackets 28. Choke jackets 28 often experience high turbulence and corresponding mechanical erosion and therefore can be a potential source of leaks.

Figure 2:
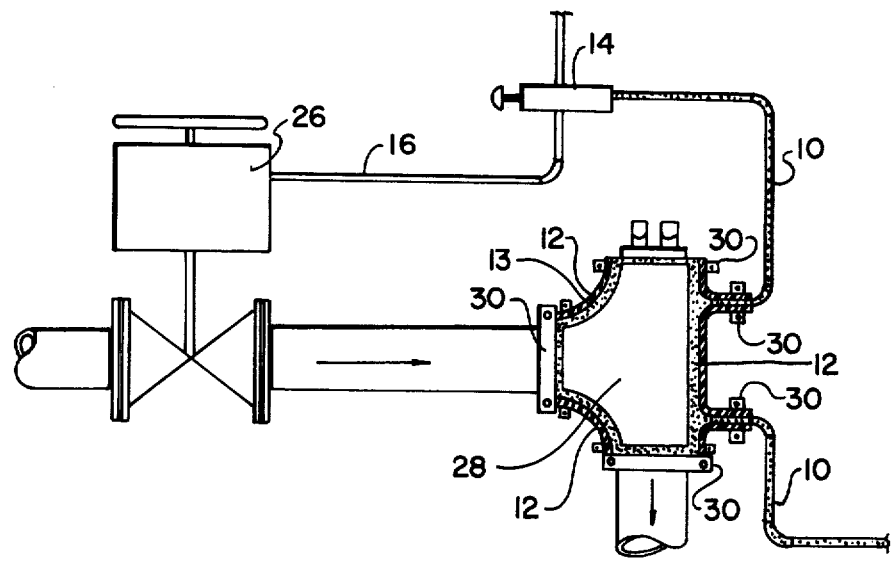
FIG. 2 is a schematic diagram of the preferred embodiment of the apparatus of the present invention.
Figure 3:
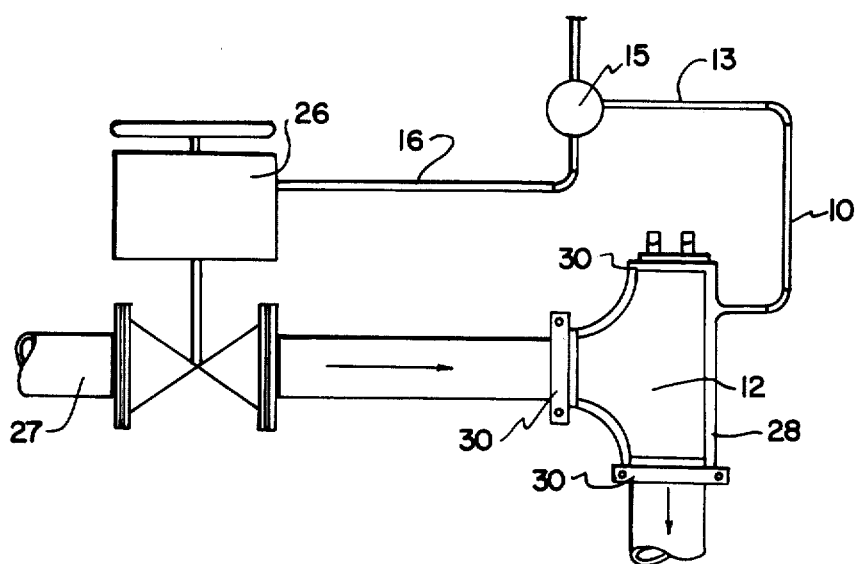
FIG. 3 is a schematic diagram of an alternative embodiment of the apparatus of the present invention.

FIGS. 2 and 3 illustrate schematic piping diagrams of the preferred and alternative embodiments of the apparatus of the present invention illustrating their connection with the manumatic valves 26 and choke jacket 28.

FIG. 2 provides the preferred embodiment of the apparatus of the present invention where a rupture of bladder 12 occurs often, a leak from choke jacket 28 is collected within bladder 12. In FIG. 2 can be seem manumatic valve 26 which is held in an open position by means of a supply of instrumentation control fluid flowing through conduit 16. Conduit 16 passes through controller 14 which can be a CRBBM type controller as manufactured by U.S.I. Controller 14 is held in a posture which allows high pressure fluid 16 to pass therethrough in order to maintain valve 26 in an open position as long as regulator 14 additionally receives low pressure control fluid through supply line 10. Interruption of instrumentation control fluid to controller 14 causes the controller to "shift" and interrupt the supply of instrumentation control fluid to valve 26. Since valve 26 requires a supply of control fluid to operate, it can be seen that an interruption in the supply of instrumentation control fluid in conduit 16 causes the valve 26 to close, halting the flow of fluids such as natural gas therethrough. As can be seen best in FIG. 2, supply conduit 10 feeds control fluid to bladder 12 and thereafter to regulator 14. It can be seen that a rupture of bladder 12 (as will occur when a leak from choke jacket 28 fills bladder 12) will interrupt the flow of instrumentation control fluid to regulator 14.

In FIGS. 2 and 3, bladder 12 is shown encasing choke jacket 28, but it can be used on any suspect piping fitting where erosion could produce the occurence of leaks from the fitting at any time without notice.

Bladder 12, as will be discussed more fully hereinafter, is attached to a suspect fitting such as a choke jacket 28 by means of, for example, a plurality of pipe clamps 30. The bladder would be generally open at one end portion, as is illustrated in FIG. 4-A, so that it could slip over the choke jacket. The slitted portion designated generally by the numeral 40 in FIG. 4-A would be sealed by gluing or like closure while the openings 42-44 would be sealed by means of clamps 30, as is illustrated in FIG. 4-A. Thus, a sealable encapsulating bladder 12 would be provided about any suspect fitting, with the end result that a leak occuring from the fitting 28 would be collected by the bladder and thereafter transmitted through a suitable conduit 45 to shut off apparatus or like indicating structure, as will be discussed more fully hereinafter, and as was illustrated heretofore in FIGS. 2 and 3. Note that an air space 13 can be provided between bladder 12 and fitting 28 into which air space leaks from fitting 28 will flow and thus be collected. Air space 13, likewise, provides a space into which instrumentation air can flow through conduits 10 enroute to controller 14, as was described more fully above.

FIG. 3 illustrates an alternative embodiment of the apparatus of the present invention which shows a typical manumatic control valve 26 controlling the flow of oil and gas from line 27 which leaves Christmas tree 20 (note FIG. 3). An instrumentation gas supply fed through conduit 16 and towards vavle 26 maintains valve 26 in an "open" position. Regulator 15 can be for example, a Fisher Model 164-A regulator set at approximately five to ten pounds in an exemplary installation.

Such a regulator as the Fisher Model 164-A is a three-way pneumatic switching valve. It is spring loaded and diaphragm actuated. A control connection to the regulator applies sufficient pressure to the diaphragm causing a valve plug within to shift and change the route of fluids flowing through the regulator.

Utilizing regulator 15, a normally open port within regulator 15 allows the control fluid supply to pass through conduit 16 and maintain valve 26 in an "open" position. If it is undesirable to maintain a pressure on bladder 12, as is done in the preferred embodiment, the alternative embodiment provides no pressure on bladder 12, but rather bleeds pressure through line 13 in the event of a leak within fitting 28. It can be seen that the leak from fitting 28 will be caught within bladder 12 and flow through conduit 13, causing a build up of pressure within both bladder 12 and line 13 and shifting a piston or like valving member within regulator 15 to close the control fluid supply in conduit 16. The lack of this control fluid to valve 26 causes it to close (as is known in the art).

The embodiments of the present invention above disclosed provide a simple solution for the problem of early detection of leaks in suspect fittings of flow lines, for example, as in the choke jacket of a Christmas tree portion of a natural gas well.

As with the embodiment shown in FIG. 2, bladder 12 would be attached in an encapsulating fashion about the suspect fitting, such as a choke jacket 28 by using clamps 30, as is illustrated in FIG. 3. Clamps 30 can be for example, generally "U" shape pipe clamps as is illustrated more particularly in FIG. 4 and 4-A.

FIGS. 4, 4-A and 5 illustrate more particularly, the structure of bladder 12. Bladder 12 is in the preferred embodiment comprised of a generally flexible material such as, rubber, plastic film, or the like.

Such a pliable structure could easily be formed around a suspect fitting as is ullustrated in FIG. 4 with a typical oil field choke jacket 28.

The sealing of bladder 12 about suspect fitting 28 would be accomplished, for example, by using a plurality of pipe clamps 30, as is illustrated in FIGS. 4 and 4-A, each clamp 30 could be for example, comprised of a pair of generally "U" shaped clamp halves 30, 32, with each clamp half providing outwardly depending tabs 34 with openings 35 therethrough. Clamp halves 31, 32 could be assembled by using a bolted connection 40 as illustrated best in FIG. 4-A.

In FIG. 4-A, a bladder 12 is provided which is shaped to generally fit over and encapsulate an oil field choke jacket 28. Note that a pair of slits 40, 46 are provided which will allow bladder 12 to be split partially into a pair of bladder halves 12-A and 12-B. Bladder halves 12-A and 12-B would be separated by hand and the entire bladder structure 12 pulled over the suspect fitting such as, choke jacket 28 and thereafter sealed using pipe clamps 30 as aforementioned. Slits 40 and 46 could be sealed by using glue or like suitable means. A rubber cement or rubber glue could be used to seal slits 46 and 40, if desirable.

The entire bladder structure 12 could be totally split into two separate halves which are not connected at all, if desirable. In such an instance, each half would be mounted to the pipe suspect fitting and thereafter, glued along the slits 40 and 46 with the sealable connection to fitting 28 being completed using pipe clamps 30.

In FIGS. 4 and 5, there is seen a conduit 10 which is integrally attached to bladder 12. Each conduit line 10 is schematically illustrated in FIGS. 2 and 3 and provides a conduit which instrumentation gas (FIG. 2) or a collected leak (FIG. 3) could pass to perform the desired indication and shut off function.

It will be understood by one skilled in the art that the bladder structure 12 thus, taught by the present invention is totally portable and could easily be attached to any existing piping system while the piping system is in operation. Thus, the present invention provides a leak detection and shut off apparatus which would easily be added to existing gas wells, oil wells, or like piping systems where fittings are suspect and where leaks might occur with the result being possibly a loss of life or like catastrophe.

In FIG. 5, conduit 10 could connect to a section of conventional tubing 50 with the connection being perfected in a sealable fashion using clamps 30 and a bolted 48 connection.

The apparatus of the present invention is totally portable and capable of operating without the intervention of a human operator, and can thus avert the possibility of any hazards caused by leakage, which can eventually lead to explosion, fire, or like threats to property, life, and the environment.

The present invention would allow a flow line control valve to be shut off, and stop the flow of gas from a gas well and thus avert the escape of gas through any minute leak which might occur in a suspect fitting which leak over a period of time in a remote area could grow with the continued escape of natural gas or like volatile fluid posing a hazard to both individuals and the environment. Such an early leak detection and valve closure system would save the unnecessary and wasteful loss of much fuel before the leak is detected, even in the case where a disaster does not occur.

Using the alternative embodiment, line 13 leaving bladder 12 (see FIG. 3) provides an instrumentation line which would operate any pressure or volume change responsive alarm, pressure guage or like indicator. Thus, as a leak in a suspect fitting occured, the fluid would be trapped in bladder 12 and either pressure or volume or both would be transmitted to line 13 for operation of the desired indicator—the leak being detected.

Because many varying and different embodiments may be made within the scope of the inventive concept taught herein, and because many modifications may be made in the embodiments herein detailed in accordance with the descriptive requirements of the law, it should be understood that the details herein are to be interpreted as illustrative and not in a limiting sense.

What is claimed as invention is:

1. An apparatus for detecting leaks in suspect piping system fittings comprising:
    a. non-rigid bladder means for sealably encapsulating a suspect fitting portion of a piping system where leaks may occur;
    b. means for sealably attaching said non-rigid bladder means to the suspect fitting; and
    c. valve closure means responsive to the occurrence of a leak in the suspect fitting and collected by said bladder means for halting the flow of fluid within the piping system to which said bladder means is attached.

2. The leak detection apparatus of claim 1 wherein said bladder means is portable, being attachable to an existing suspect piping fitting during operation.

3. The leak detection apparatus of claim 1 wherein said bladder means is a pliable bladder jacket.

4. The leak detection apparatus of claim 1 wherein said valve closure means comprises,
    i. a valve in the piping system for controlling flow therethrough; said valve movable from a first "open" to a second "closed" position.
    ii. regulator means for operating said valve from said valve from said first "open" to said second "closed" position, said regulator means being in pneumatic connection with said bladder means and operating said valve responsive to the occurrence and collection of leaks from the suspect fitting to said bladder means.

5. An apparatus for detecting leaks in suspect piping fittings comprising:
   a. bladder means for sealably encapsulating a suspect piping fitting where leaks may occur;
   b. clamp means attachable about said bladder means for sealably attaching said bladder means to a suspect piping fitting, leaks occurring in the piping fitting being at least initially collected within said bladder means;
   c. regulator means in pneumatic connection with said bladder means, said regulator means being operable responsible to the accumulation of a leak within said bladder means;
   d. conduit means for transmitting leaks collected by said bladder means to said regulator means;
   e. valve means for controlling flow within the piping system to which said bladder means is attached, said valve means being operated at least in part by said regulator means from a first "open flow" position to a second "closed flow" position, the transmittal of a leak occurring in the suspect piping fitting through said conduit means and to said regulator means causing said regulator means to operate said valve means from said first "open flow" position to said second "closed flow" position halting flow in the piping system.

6. The leak detection apparatus of claim 5 wherein said bladder means is a portable bladder jacket attachable to an existing piping system during operation while fluids are flowing through the piping system.

7. The leak detection apparatus of claim 5 wherein said clamp means is at least one pipe clamp.

8. The leak detection apparatus of claim 5 wherein said conduit means is an instrumentation conduit live pneumatically connecting said bladder means and said regulator means.

9. The leak detection apparatus of claim 5 wherein said valve means is a control valve mounted in the piping system to which said bladder means is attached.

10. A leak detection and shutoff apparatus for oil and gas wells comprising:
    a. oil/gas well wing valve means for controlling flow of oil/gas at least in part from the oil/gas well;
    b. non-rigid bladder means for sealable encapsulating a suspect fitting portion of an oil/gas well;
    c. attachment means for sealably attaching said bladder means to the suspect fitting, gas leaks occurring in the suspect fitting being collected within said bladder means; and
    d. instrumentation means connecting said bladder means and said wing valve means of said oil/gas well for closing said wing valve means, said instrumentation means closing said wing valve means responsive to the occurrence of a leak in the suspect fitting, the leak collected by said bladder means.

11. The oil/gas well leak detection and shutoff apparatus of claim 10 wherein the suspect fitting encapsulated by said bladder means is the oil/gas well choke jacket.

12. The oil/gas well leak detection and shutoff apparatus of claim 10 wherein said instrumentation means is a regulator, said regulator being capable of operating the wing valve from a first "open" to a second "closed" position responsive to the occurrence of a leak in the suspect fitting collected by said bladder means.

13. The oil/gas well leak detection and shutoff apparatus of claim 12 further comprising a conduit pneumatically connecting said bladder means and said regulator, leaks collected by said bladder means being transmitted through said conduit to said regulator.

14. The oil/gas well leak detection and shutoff apparatus of claim 10 wherein said attachment means is at least one pipe clamp sealably clamping said bladder means to the suspect piping fitting.

15. A leak detection and shutoff apparatus for oil and gas wells comprising:
    a. bladder means for incapsulating a suspect fitting portion of an oil or gas well where leaks may occur;
    b. attachment means for sealably affixing said bladder means to the suspect fitting, said bladder means then collecting leaks occuring within the suspect fitting;
    c. valve means on said oil or gas well for controlling the flow of oil/gas from said oil or gas well, said valve means being operable from a first "open flow" position to a second "closed flow" position;
    d. regulator means in pneumatic connection with said bladder means for operating said valve from said "open flow" positon to said "closed flow" position;
    e. Conduit means for transmitting leaks collected within said bladder means to said regulator;
    f. an instrumentation line connecting said valve means and said regulator means, the accumulation of a leak in the suspect fitting by said bladder means and transmitted to said regulator means through said conduit means effecting in said regulator means an operation of said valve means from said first "open flow" position to said "second closed" flow position.

16. The oil and gas well leak detection and shutoff apparatus of claim 15 wherein the suspect fitting is an oil/gas well choke jacket, and said valve means is an oil/gas well wing valve.

* * * * *